(12) United States Patent
Kleff

(10) Patent No.: US 7,686,094 B2
(45) Date of Patent: Mar. 30, 2010

(54) FIRE PROTECTION DEVICE FOR A ZONE

(76) Inventor: Wolfgang Kleff, Kanngiesser Strasse 14, 26629 Grossefehn (DE)

( * ) Notice: Subject to any disclaimer, the term of this patent is extended or adjusted under 35 U.S.C. 154(b) by 0 days.

(21) Appl. No.: 11/825,031

(22) Filed: Jul. 3, 2007

(65) Prior Publication Data

US 2008/0000648 A1    Jan. 3, 2008

(30) Foreign Application Priority Data

Jul. 3, 2006   (DE) .................. 10 2006 030 627

(51) Int. Cl.
*A62C 8/06* (2006.01)
*A62C 3/00* (2006.01)

(52) U.S. Cl. .................. 169/50; 169/48; 169/49; 169/54; 52/3; 52/DIG. 12

(58) Field of Classification Search .............. 169/45, 169/48–50, 54; 52/3, DIG. 12, DIG. 14
See application file for complete search history.

(56) References Cited

U.S. PATENT DOCUMENTS

| | | | | |
|---|---|---|---|---|
| 3,715,843 A | * | 2/1973 | Ballinger | .................. 52/3 |
| 5,860,251 A | | 1/1999 | Gleich | |
| 5,966,877 A | * | 10/1999 | Hawes | .................. 52/63 |
| 6,048,805 A | * | 4/2000 | Gottfried | .................. 442/138 |
| 6,521,362 B2 | * | 2/2003 | Koeppen | .................. 169/46 |
| 6,820,373 B1 | * | 11/2004 | Bundy et al. | .................. 52/1 |
| 6,881,506 B2 | * | 4/2005 | Anderson et al. | .................. 442/228 |
| 2005/0150664 A1 | * | 7/2005 | Miller et al. | .................. 169/45 |

FOREIGN PATENT DOCUMENTS

| | | |
|---|---|---|
| DE | 100 49 497 | 4/2002 |
| DE | 103 34 915 | 4/2005 |
| WO | WO 97/44094 | 11/1997 |

* cited by examiner

*Primary Examiner*—Darren W Gorman
(74) *Attorney, Agent, or Firm*—Collard & Roe, P.C.

(57) ABSTRACT

In a fire protection device for protecting a zone in which a building and/or people is/are located, it is suggested that it be constructed from fire-resistant material and be larger than the spatial dimensions of the zone to be protected. This fire protection device particularly enables the owner or resident of a building to protect the building from the threat of an external fire even when the fire service is not present.

11 Claims, 5 Drawing Sheets

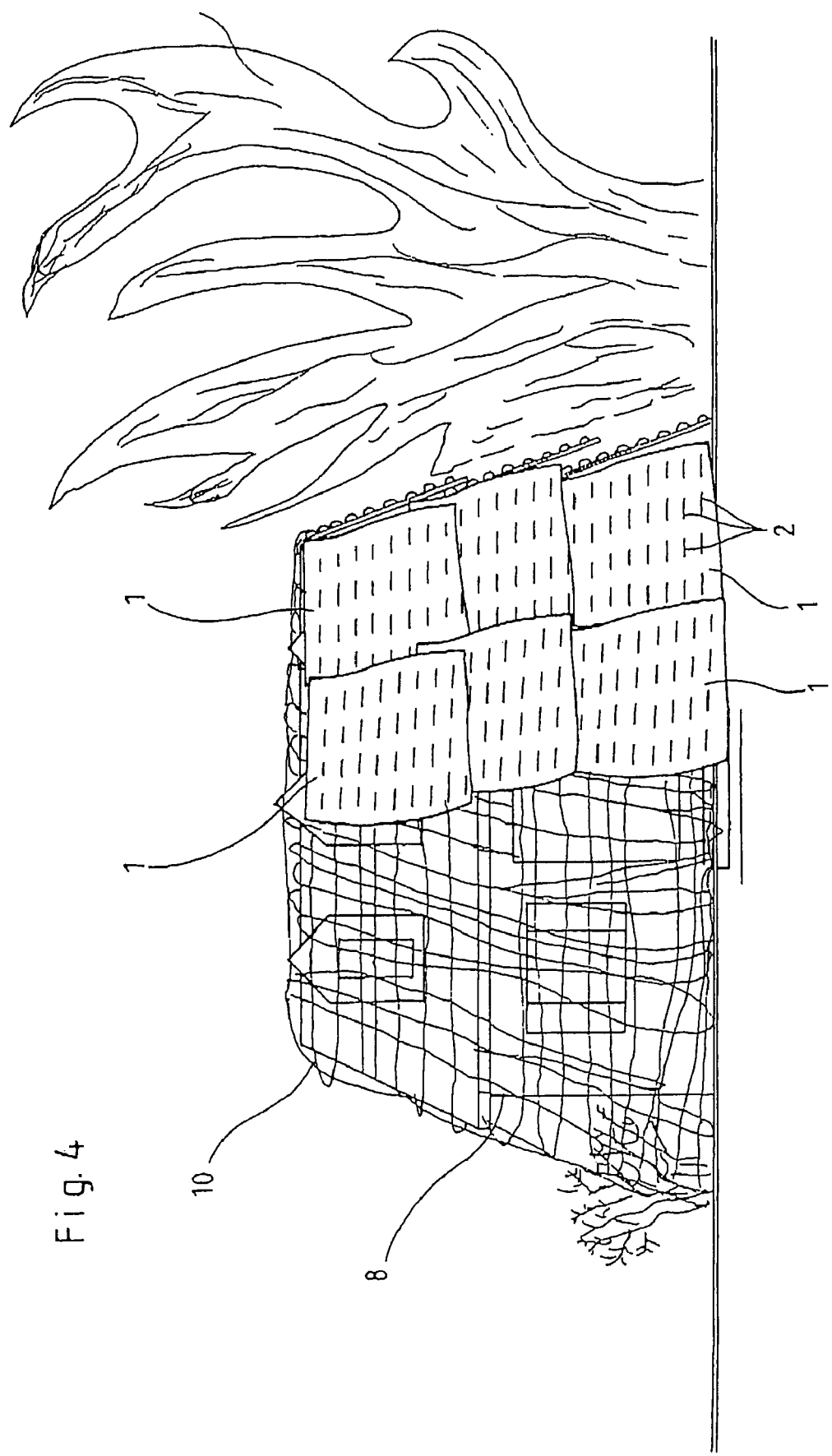

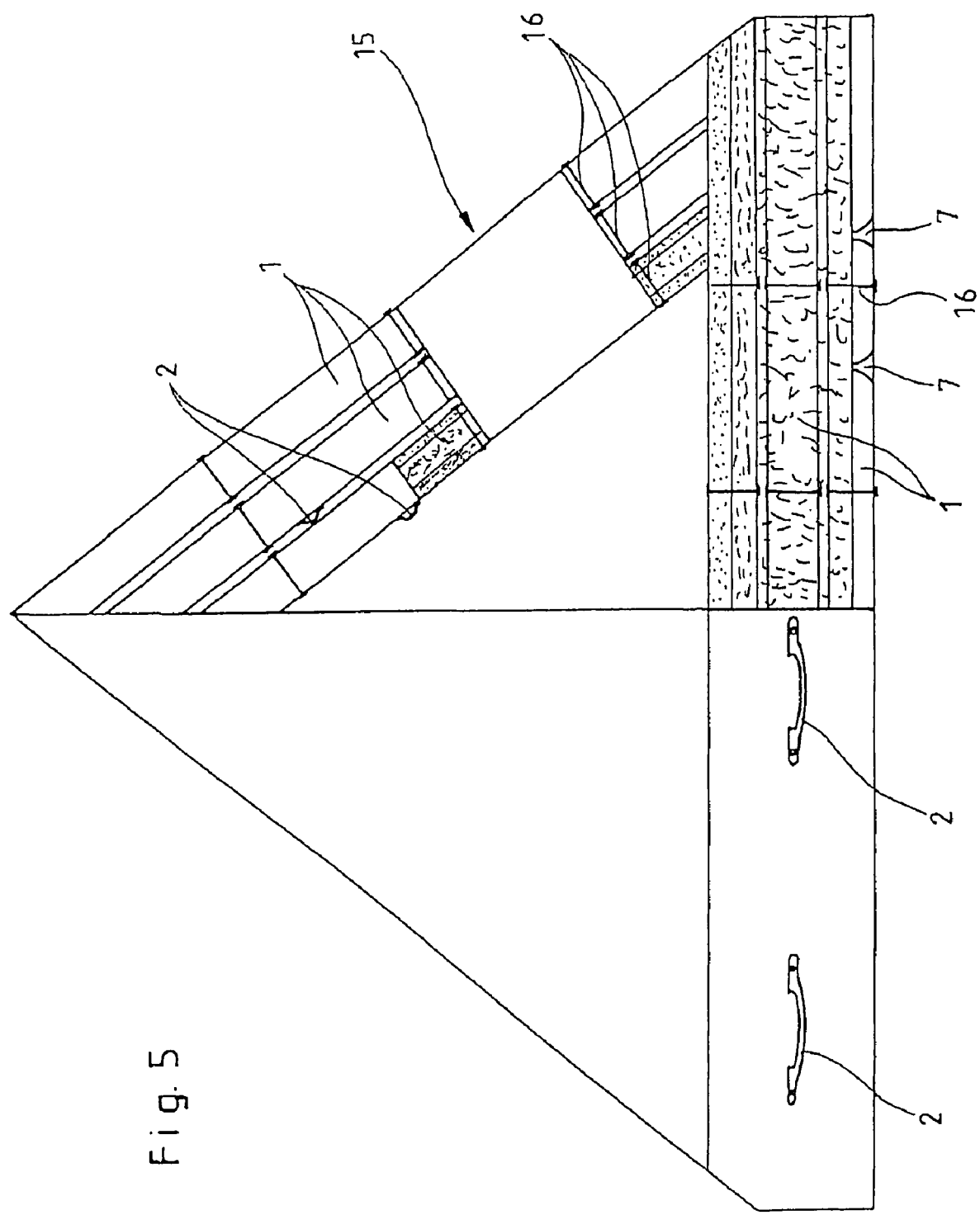

FIRE PROTECTION DEVICE FOR A ZONE

CROSS REFERENCE TO RELATED APPLICATIONS

Applicant claims priority under 35 U.S.C. §119 of German Application No. 10 2006 030 627.9 filed Jul. 3, 2006.

BACKGROUND OF THE INVENTION

1. Field of the Invention

The invention relates to a fire protection device for a zone requiring protection, in which a building or people is/are located.

2. Description of the Related Art

Fires in buildings are often caused by technical faults inside the building. Many fire protection devices have already been suggested for such circumstances, to prevent fires from occurring and/or to combat them when they do occur.

If a fire threatens a building from outside, for example if the building is at risk from a fire in a neighboring house or an approaching forest fire, the fire protection for the building essentially consists of action by the fire service. However, if entire streets are threatened, as may happen in a forest fire or wildfire, for example, it is often impossible to protect all of the houses by deploying the fire service because their resources are insufficient.

The object of the invention is to suggest a fire protection device of the species described in the preceding, particularly for a residential building, which enables the owner or resident of the building to protect it from the danger of an outside fire even when the fire service is not in attendance. In general, the fire protection device is intended to provide fire protection by simple means.

SUMMARY OF THE INVENTION

This object is solved according to the invention in that the fire protection device is constructed as a covering made from fire-resistant material, and is larger than the spatial dimensions of the zone to be protected.

The fire protection device according to the invention does not provide active firefighting means, instead it passively protects a zone from fire damage. This passive protection is formed by the covering, which must be positioned between the building and the fire threat.

To do this, the endangered zone, for example the threatened side of a building or even the entire building, must be covered with this covering. Since the covering is made from a fire-resistant material, the fire may reach it, but it is not destroyed by the fire. Accordingly, structural elements of a building behind the covering are prevented from catching fire.

In order for the covering to be able to withstand prolonged exposure to fire, a refinement of the invention provides that the covering is constructed from multiple plies, and that one of the plies includes a glass fibre layer. This construction in multiple plies lends the covering toughness, thermal insulation properties, and the capability to resist fire. This fire resistance is particularly promoted by the ply with the glass fibre layer. Additionally or alternatively, it may also be provided that the covering with multiple plies includes a layer with a mineral fibre. This layer too is characterized by its good resistance to fire. The mineral fibre layer may be for example a layer of basalt fibre.

In order to dispense with the need for a crane or some similar, complicated and expensive mechanism when protecting the side of a building, or the entire building, with the covering according to the invention, a refinement of the invention provides that the covering is assembled from a plurality of surface sections which are attached to each other by connecting means. The surface sections may be secured to the building or placed on parts of the building one after the other. They are attached to each other, wherein placing the surface section may be alternated with attaching the same surface section to surface sections already in position. The fire protection device according to the invention may thus be constructed in steps from a number of surface sections. The connecting means used in this context may have the form of loops, for example, that may be attached to each other to connect adjacent surface sections. In this context, it is preferably ensured that a part of the respective adjacent surfaces is covered, so that no zones are formed between the individual surface sections that would allow fire to penetrate. At the same time, the loops may serve as climbing aids for people who are securing to the surface elements to the house.

The fire protection device preferably also includes a support structure for the surface sections. The support structure may form a base on which the surface sections are to be mounted, particularly when there are insufficient securing points for the surface sections on the building itself.

The support structure may include a strap element and at least one additional net element. This net element may be used together with the strap element to provide buildings with a net-like covering, to which the surface sections are then attached by means of the loops that are preferably present thereon. In this context, the strap element is then used for attaching the net element.

Loops may also be arranged on the upper and lower faces of the surface sections to enable people to climb up surface sections that are already secured. Spacers may be located in the surface sections to prevent individual surface sections from expanding, caused for example by the individual plies separating from each other.

In a further refinement of the invention, it is provided that the plies of the covering are filled with a non-flammable material. This non-flammable material insulates the two opposing sides of the surface sections from each other. The peripheral edges of the covering may be formed by closed seams to prevent the non-flammable material from falling out of the surface sections. Rivets may also be provided to further reinforce the multiple-ply covering.

Finally, a refinement of the invention provides that a protected zone is formed by the covering itself. Particularly in the case of multiple surface sections, a tent-like structure may be created that provides protection particularly for people. In this context, surface sections may be placed on top of each other in several layers for better thermal isolation.

BRIEF DESCRIPTION OF THE DRAWINGS

Embodiments of the invention that show additional inventive features are shown in the drawing. The drawing shows:

FIG. 4: another, enlarged side view of the building of FIGS. 3a to 3d with fire protection device attached and FIG. 5: a partial cutaway view of a possible tent-like erection formed by the surface sections.

DETAILED DESCRIPTION OF PREFERRED EMBODIMENTS

The fire protection device shown in the figures consists of individual surface sections 1. Each surface section 1 has the form of a mat, and is constructed with multiple plies. Connecting and climbing means designed as loops 2 are located on the edges of surface section 1 and on the upper face of surface section 1.

Figure 1:
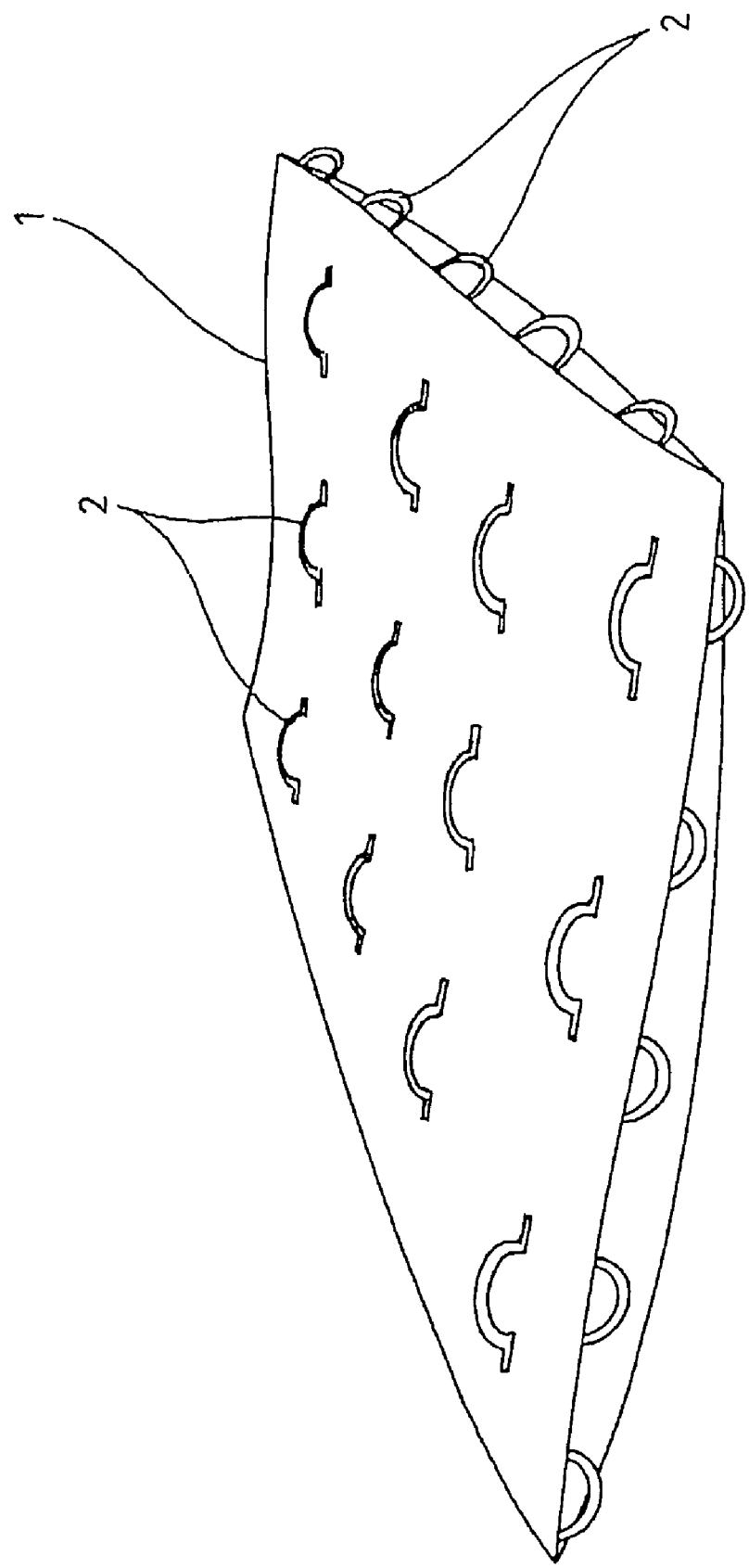
FIG. 1: a perspective view of a surface section of the fire protection device constructed as a covering for a building.
Figure 2:
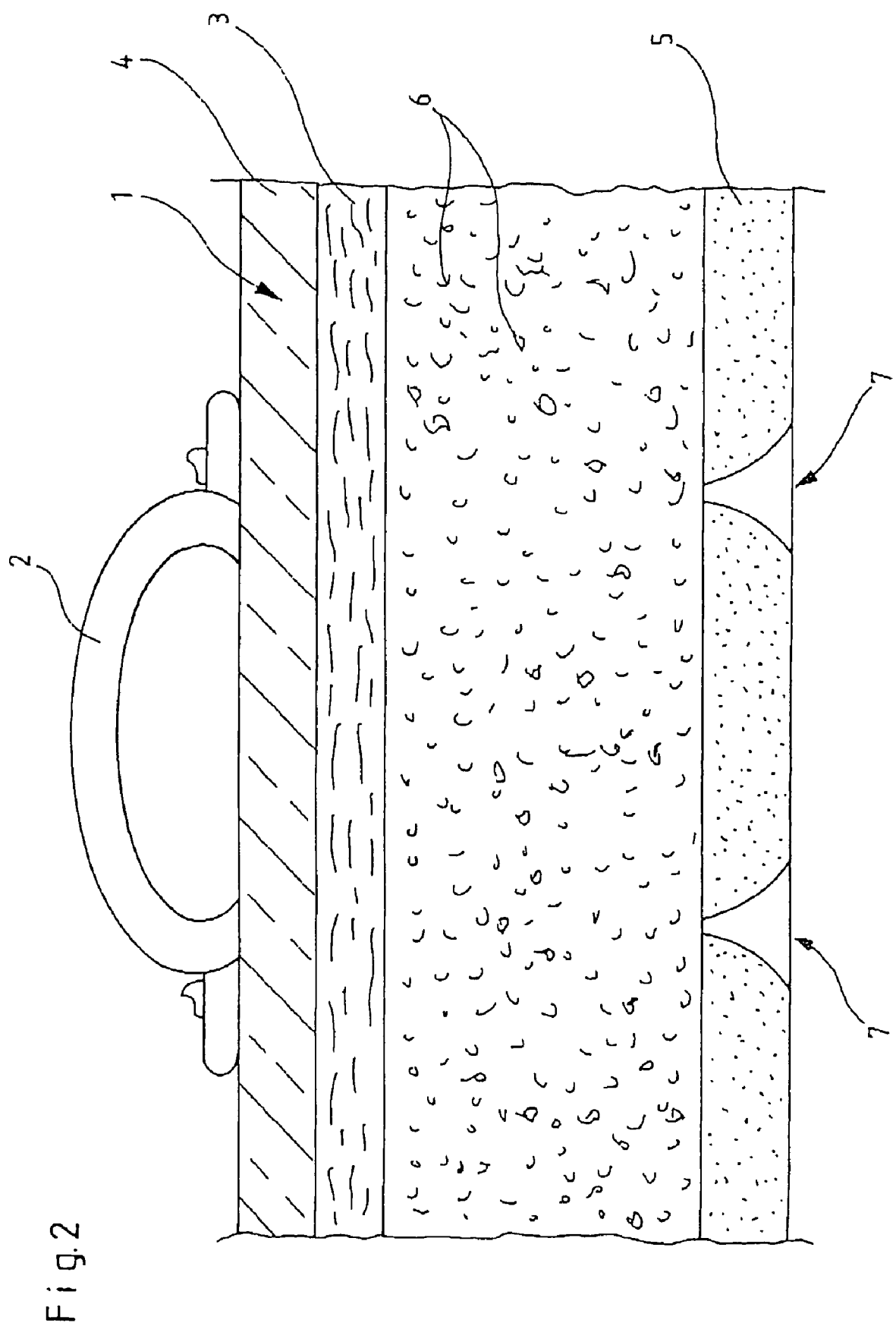
FIG. 2: an enlarged cross sectional view of the surface section of FIG. 1, FIG. 3a-3d: side views of a building to which the fire protection device of the invention is attached.

FIG. 2 shows loops 2 on the upper face of surface section 1. The uppermost ply of surface section 1 is formed by a glass fibre layer 3 that has an aluminum-coated surface 4. The bottom ply of surface section 1 is formed by a fire-resistant material 5, for example a layer of mineral fibre.

The cavity between glass fibre layer 3 and material 5 is filled with padding 6 of fire-resistant material. Perforations 7 are created in material ply 5 of the surface section 1 to be filled with padding 6.

Figure 3A:
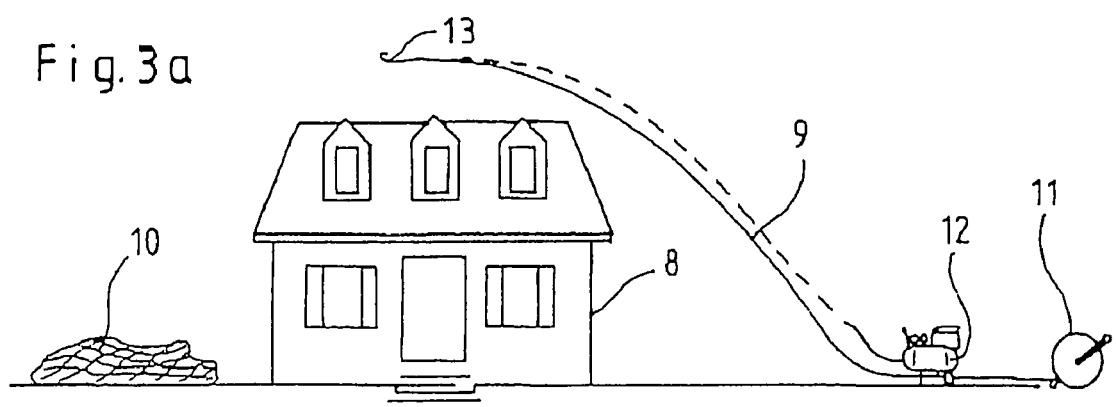
Figure 3B:
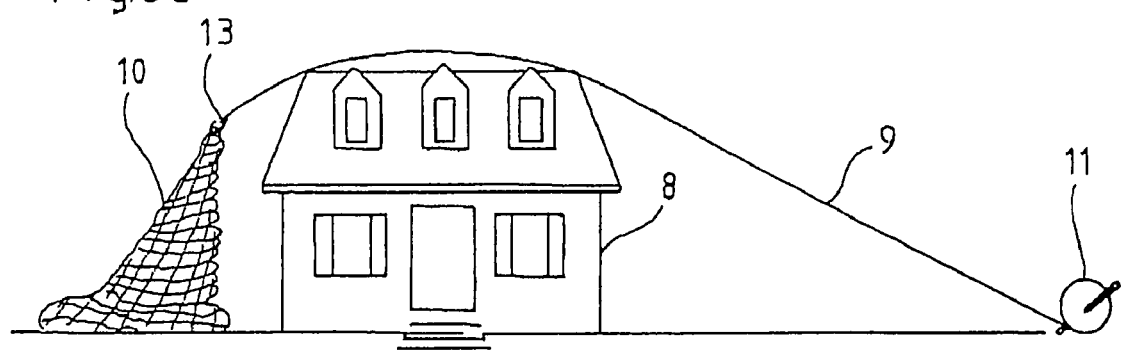

When a fire protection device according to the invention is secured to a building 8, the procedure is performed in steps as shown in FIGS. 3a to 3d. First, a support structure is placed on the building 8. This support structure includes a strap element 9 and a net element 10. Net element 10 is initially detached from building 8. Initially, strap element 9 is also arranged beside building 8, it is raised by a winch 11 and thrown over building 8 with the aid of a casting device 12. A hook 13 is located on the free end of strap element 9, to which net element 10 may be attached as shown in FIG. 3b.

Figure 3C:
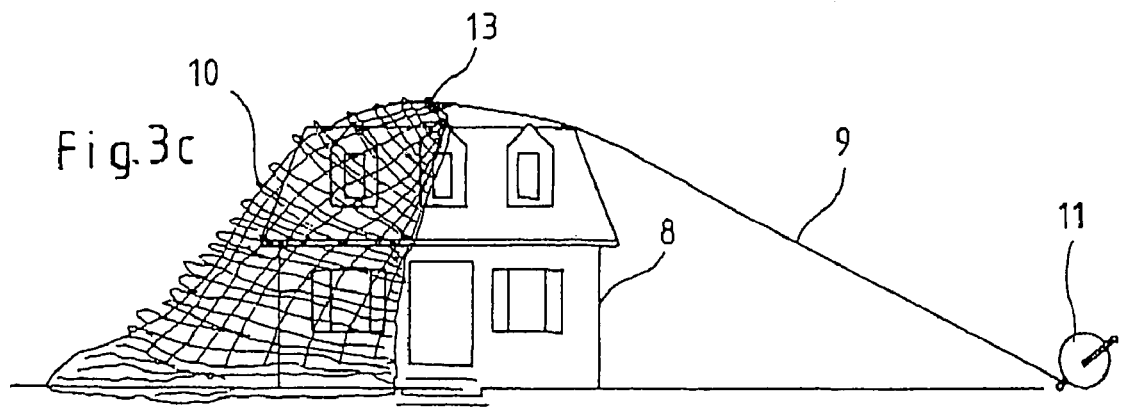
Figure 3D:
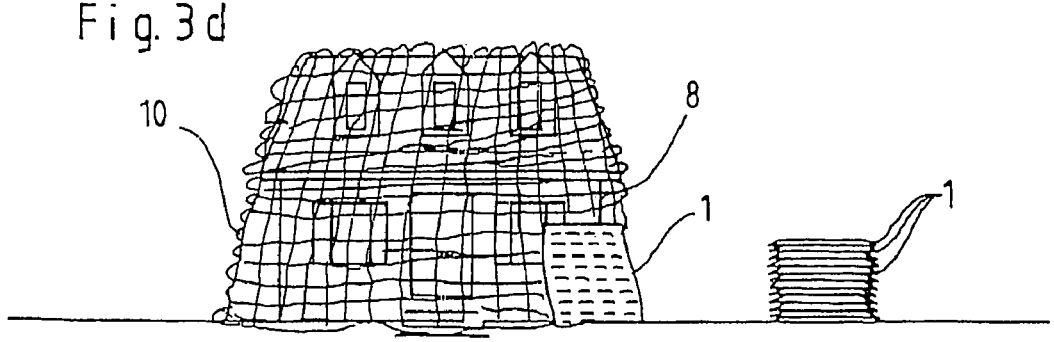

In FIG. 3c, strap element 9 is retracted onto winch 11. In doing so, net element 10 is drawn over building 8. If net element 10 is able to catch behind protruding corners of the roof, for example around dormer windows, net element 10 may be used at the same time as a climbing aid for people who may then be able to help with passing net element 10 over the building.

In FIG. 3, strap element 9 and winch 11 have already been removed. Net element 10 has been drawn completely over building 8 and is ready for surface sections 1 to be attached. Surface sections 1 are secured on net element 10 with the help of loops 2.

FIG. 4 shows surface sections 1 secured from top to bottom of a building 8. Surface sections 1 are arranged to overlap each other in the manner of fish scales, thus forming a protective barrier against a fire 14.

The tent shown in FIG. 5 is created from a number of surface sections 1. The surface sections 1 are arranged in a layers of three. Each of the individual surface sections 1 is of the multiple-ply construction described previously.

Openings 15 may be provided in surface sections 1 to allow people to get inside the tent. These openings 15 may be constructed so as to be sealable. FIG. 5 also shows that spacers 16 are located in the surface sections 1.

The invention claimed is:

1. A fire protection device for a zone requiring protection, in which a building or people can be located, said fire protection device being constructed as a covering made from fire-resistant material, and being larger than the spatial dimensions of the zone to be protected, wherein the covering is assembled from a plurality of surface sections, each of said surface sections comprising an upper face bounded by peripheral edges of the surface section, the surface sections being attached to each other by connecting means, said connecting means comprising loops, said loops being located on the peripheral edges of each of said surface sections, said surface sections further comprising additional loops which form climbing means, said additional loops being evenly distributed across the entire upper face between the peripheral edges of each surface section.

2. The fire protection device as recited in claim 1, wherein the covering is constructed from multiple plies and has one ply with a glass fibre layer.

3. The fire protection device as recited in claim 1, wherein the covering is constructed from multiple plies and includes a layer made from a mineral fibre.

4. The fire protection device as recited in claim 3, wherein the mineral fibre layer is a basalt fiber layer.

5. The fire protection device as recited in claim 1, wherein it has at least one support structure for the surface sections.

6. The fire protection device as recited in claim 5, wherein the support structure includes at least one strap element.

7. The fire protection device as recited in claim 5, wherein the support structure includes at least one net element.

8. The fire protection device as recited in claim 2, wherein the plies of the covering are filled with a non-flammable material.

9. The fire protection device as recited in claim 8, wherein the peripheral edges of the covering are formed by closed seams.

10. The fire protection device as recited in claim 1, wherein a protected zone is created by the covering itself.

11. The fire protection device as recited in claim 2, wherein the device comprises three plies, wherein the ply of the glass fibre layer has an aluminum-coated surface and is an outer ply, a bottom ply is made of mineral fibre, and a layer of padding of fire-resistant material is between the outer ply and the bottom ply.

* * * * *